United States Patent [19]
Ladouceur

[11] Patent Number: 5,502,884
[45] Date of Patent: Apr. 2, 1996

[54] METHOD OF INSTALLING FASTENERS INTO A PANEL USING A SELF-ADJUSTING FASTENER INSTALLATION HEAD

[75] Inventor: Harold A. Ladouceur, Livonia, Mich.

[73] Assignee: Multifastener Corporation, Detroit, Mich.

[21] Appl. No.: 449,725

[22] Filed: May 24, 1995

Related U.S. Application Data

[62] Division of Ser. No. 198,367, Feb. 18, 1994.

[51] Int. Cl.$^6$ .................................................. B23Q 17/00
[52] U.S. Cl. ............................................ 29/407.05; 29/432
[58] Field of Search ........................... 29/21.1, 702, 706, 29/707, 716, 720, 798, 243.5, 283.5, 407, 432

[56] References Cited

U.S. PATENT DOCUMENTS

| 3,961,408 | 6/1976 | Goodsmith et al. | 29/706 |
| 4,574,453 | 3/1986 | Sawdon | 29/798 |
| 5,329,694 | 7/1994 | Sickels et al. | 29/798 |

*Primary Examiner*—David P. Bryant
*Attorney, Agent, or Firm*—Howard & Howard

[57] ABSTRACT

A system is disclosed for installing fasteners in a panel and automatically sensing and compensating for certain error conditions which commonly arise in the installation process. The system includes monitoring the load exerted during the installation process and comparing the exerted load to nominal load values. If an error results between the two load values, appropriate corrective action is taken. If there is no corrective action which can be initiated to rectify the error condition, the system is halted.

3 Claims, 9 Drawing Sheets

METHOD OF INSTALLING FASTENERS INTO A PANEL USING A SELF-ADJUSTING FASTENER INSTALLATION HEAD

This is a divisional of copending application Ser. No. 08/198,367 filed on Feb. 18, 1994.

TECHNICAL FIELD

The present invention relates to fastener installation systems, and more particularly relates to systems for sensing the improper installation of a fastener.

BACKGROUND OF THE INVENTION

Installation systems for installing hardware (such as fasteners) to metal panels, are well known in the art. For example, U.S. Pat. No. 4,765,057 discloses a self-attaching fastener, panel assembly, and installation apparatus. Also, U.S. Pat. No. 4,505,416 discloses a fastener installation apparatus for installing fasteners, particularly pierce or clinch nuts, in a reliable, simplified fashion.

Although the above-referenced patents disclose systems for installing fasteners, they all rely on the assumption that once the fastener installation apparatus is properly "set up" for a given style of fastener, a given panel metal thickness, and other related parameters, all future applications having such parameters will result in acceptable installations. Although this assumption is accurate in many applications, there are instances where it is highly desirable to automatically adjust certain features of the installation apparatus to ensure the highest quality installation.

One problem frequently encountered in fastener installations is variations in the panel thickness. Normally, the installation apparatus, which has an installation head mounted to one of the platens of a press, is pre-adjusted for a certain specified thickness of metal, such as steel. However, the thickness of the material is not constant and, in fact, can vary widely, even though within acceptable tolerances. For example, hot rolled steel sheets having a width of 300 mm to 510 mm have a thickness tolerance of plus 0.25 mm for a thickness of 1.43 mm to 1.14 mm. As should be appreciated, this amount of variation can affect the performance of the installed fastener. In this example, the surface of the steel sheet which is engaged by the fastener head can vary from between 0 to 0.25 mm. In this range, the installation head will hit the material with varying force from light to heavy depending upon the panel thickness, which is varying between 0 and 0.25 mm. A force between light and heavy is the ideal installation force with the light and heavy hits being undesirable.

Another problem encountered in fastener installations is machine or press drift from a set shut height. This drift of the press from a preset shut height can be due to many factors, but is commonly due to press wear. There is little or no control over press drift, with the consequences being improperly installed fasteners.

A still further problem can occur in larger presses wherein it is difficult to control the parallelism of the platen with respect to the bolster. With more than one installation head, if the platen stroke is not parallel with respect to the bolster, light and hard hits will result and produce improperly installed fasteners.

Although it is possible to vary the shut height of the press, this is not a feasible solution in applications that are having more than one operation performed in a single stroke, which is the typical situation. The shut height is measured when the press is bottomed out, or shut, and is the distance between the bottom face of the platen and the top face of the base on which the panel to be worked is resting. This shut height is predetermined and can only be varied by changing the location of the rams; i.e., moving them with respect to one another. If the shut height is varied, it will affect all other operations, possibly compounding the adverse effect on the operations being performed on the panel.

What is needed is an apparatus and method that individually adjusts, and in some applications, automatically adjusts the affected nut installation apparatus to account for variations in the thickness of the material. In this way, thickness variations across the width and the length of the material can be monitored and adjustments made to ensure uniform installation of fasteners in a panel.

In addition to the variance in nominal panel thickness, there are other factors which could affect the integrity of the joint made between a fastener and a panel. Some of these factors include a broken or misaligned installation apparatus or fastener, the use of improper material (both fastener and panel), normal wearing of the installation tools, etc.

Thus, in view of the above, it is an object of this invention to provide a system for installing fasteners into a panel wherein the system senses one or more operational parameters and can individually adjust installation apparatus in response to the sensed parameters to ensure a consistent, high integrity joint between the fastener and panel. Another object is to record, restore, and maintain statistical process control data on every panel as opposed to random sampling.

SUMMARY OF THE INVENTION

In light of the foregoing objects, the present invention provides a system for installing fasteners into a panel which includes an adjustable installation apparatus. It should be understood that the adjustment can be made either automatically or manually. Force sensors are included in the installation apparatus for sensing the forces exerted by the installation apparatus when it installs fasteners into a panel. The force exerted by the installation apparatus is compared to the force which is normally expected to be exerted in such an installation. If the difference between the expected force and the actual installation force varies by a predetermined amount, the installation apparatus in the preferred embodiment can be adjusted or is automatically adjusted so that in subsequent installations, the force exerted by the installation apparatus will generally correspond to the predetermined force. With manual adjustment, the preferred system would include an indicator or read-out for indicating when the adjustment is complete for optimal performance.

In addition to being able to adjust the installation apparatus, the present invention also includes control means which can disable the press in response to the relative position of the fastener with respect to the installation apparatus. The control means is responsive to the position of the fastener with respect to the installation apparatus and if the fastener is not properly positioned or is not available it will shut down the press. The system of the preferred embodiment will indicate, through an indicator panel, the reason for shut-down so that corrective action can be taken.

The fastener installation apparatus of this invention includes a control means with adjacent moveable members. These members are moveable in directions generally perpendicular to one another in response to the movement of the other. One of these movable members engages either the plunger or the die button and moves it with respect to the other to adjust the distance between the plunger and the die button.

In the preferred embodiment, the control means includes a threaded member coupled to one of the members and a motor operatively engaging the threaded member to rotate the threaded member to move one of the members relative to the other member.

The fastener installation apparatus includes a sensing means for sensing the force being applied against the fastener and the panel. A comparator is provided that compares the sensed force with a predetermined force which corresponds to the optimal force for fastener attachment. The comparator produces a result and the control means reacts to this produced result and adjusts the operative length of the installation apparatus or disables the press in response to the result. The sensing means includes a strain gage load cell for collecting the force information.

In a further embodiment, the control means includes an eccentric cam coupled to the adjustable member and a motor operatively engaging the eccentric cam to rotate the cam. By rotating the cam, the adjustable member is moved to compensate for the varying thicknesses of the panel. As in the preferred embodiment, if the fastener is positioned incorrectly of isn't available, the press will be disabled so that corrective actions may be taken.

In a still further embodiment, the control means includes a wedge disposed against the adjustable member and a motor operatively engages the wedge to move the wedge and change the position of the adjustable member.

In the preferred system, the adjustable member is the plunger in the installation head. However, as indicated above the die button could be the adjustable member.

Other advantages and meritorious features of the present invention will become more fully understood from the following description of the preferred embodiments, the appended claims, and the drawings, a brief description of which follows.

DETAILED DESCRIPTION OF THE PREFERRED EMBODIMENTS

Figure 1A:
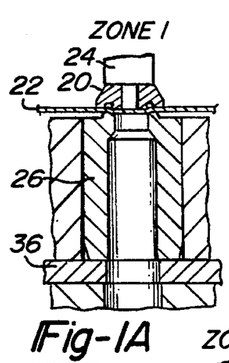
FIGS. 1A–1D depict four essential phases encountered when installing a pierce fastener in a panel.
Figure 1B:
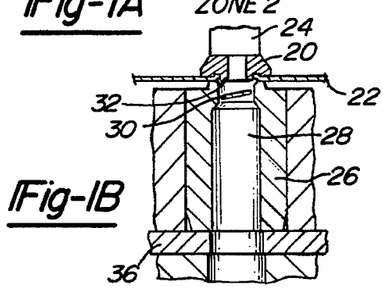
Figure 1C:
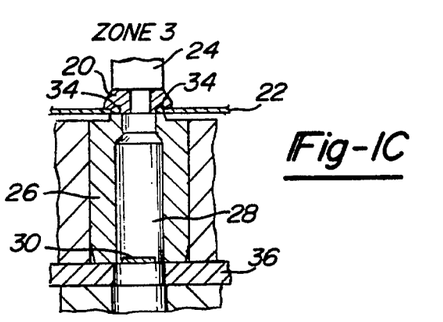
Figure 1D:
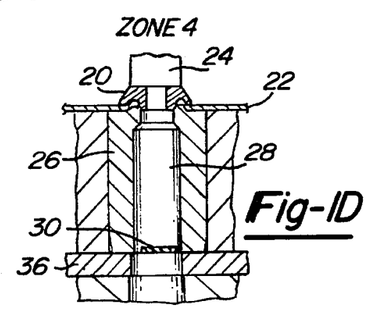

Now referring to FIG. 1A, a typical installation apparatus for installing fasteners 20 into panel 22. The panel includes a plunger 24 and die 26. Plunger 24 is part of the installation head which is attached to a press which is capable of generating several thousand pounds of force against plunger 24. A typical installation cycle is depicted in FIGS. 1A–1D and includes locating fastener 20 and panel 22 between plunger 24 and die 26 (see FIG. 1A), driving plunger 24 toward die button 26, wherein fastener 20 and panel 22 are forced together (see FIG. 1A), further driving fastener 20 into panel 22 such that pilot portion 32 of fastener 20 pierces through panel 22 thereby dislodging slug 30 through die opening 28 (see FIG. 1B), driving fastener 20 into panel 22 such that panel 22 is driven into recessed portions 34 of fastener 20, thereby forming positive engagement between fastener 20 and panel 22 (see FIG. 1C) and then applying additional force to fastener 20 and panel 22 to set fastener 20 and panel 22 (see FIG. 1D). A complete disclosure of such an installation system is disclosed in U.S. Pat. Nos. 4,630,363; 3,648,747; and 4,484,385, all of which are hereby incorporated by reference.

Figure 2:
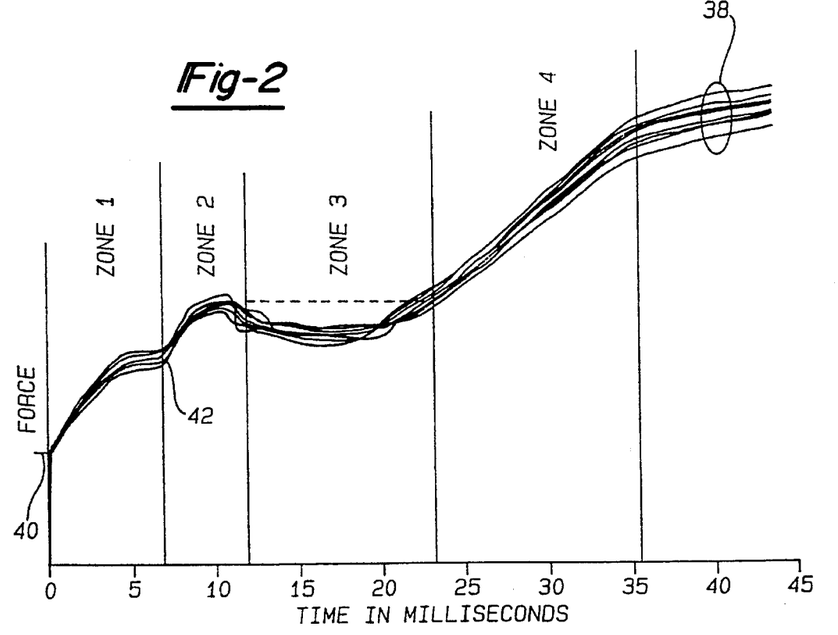
FIG. 2 is a graphical representation of a nominal force signature.

Now referring to FIGS. 1A–1D and FIG. 2, if a load sensing device 36 (such as a strain gage load cell) is placed below die 26 and multiple installations took place, a series of force signatures 38 would be generated as disclosed in FIG. 2. FIG. 2 discloses a family of eight separate force signatures superimposed on the same graph. Although each of the eight installations involve fasteners of the same design and panels having the same nominal thickness, small variations in panel thicknesses, fasteners, etc., cause each of the eight curves to be slightly different from the other curves in the family. The upper and lower bounds of force signature 38 define the bounds of all nominal installations for a given fastener/panel combination. The group of signals are appropriately termed the nominal force signature because each signal, although having its own variance with other signals, share common characteristics-which, if present, provide indications that the mating of fastener 20 to panel 22 is properly accomplished. Each phase of installing fastener 20 to panel 22 will now be discussed in conjunction with the force signatures generated therein.

Now referring to FIGS. 1–4, when plunger 24 first forces fastener 20 against panel 22, the force monitored by sensing device 36 rises sharply 40 (substantially vertical in FIG. 2). As plunger 24 moves through the first phase (or zone 1) of the installation process, the load experienced by sensing device 36 increases substantially as shown in zone 1 of FIG. 2. The beginning of zone 2 is earmarked 42 by a sharp increase in load. This sharp increase in load is due to the piercing of panel 22 by pilot portion 32 of fastener 20. Zone 3 depicts the characteristic force necessary to form panel metal 20 into recessed portions 34 of fastener 20. Lastly, zone 4 indicates the "setting load," which is the load necessary to place fastener 20 in final engagement with panel 22.

Figure 3:
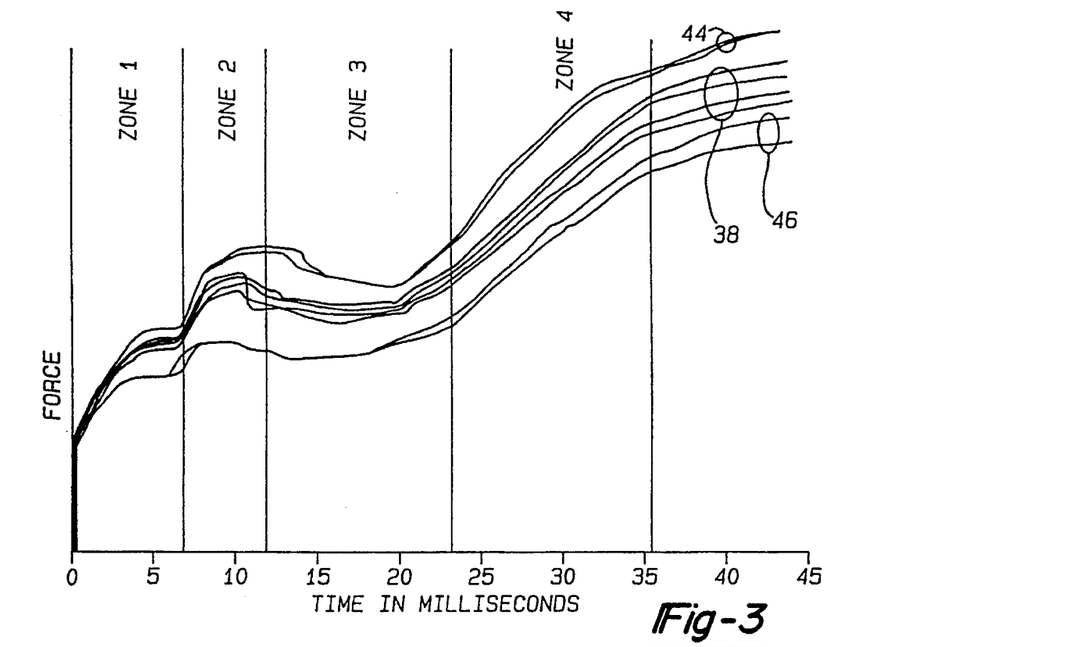
FIG. 3 is a graphical representation of a nominal force signature bounded on its upper side by a thick metal force signature and bounded on its lower side by a thin metal force signature.
Figure 4:
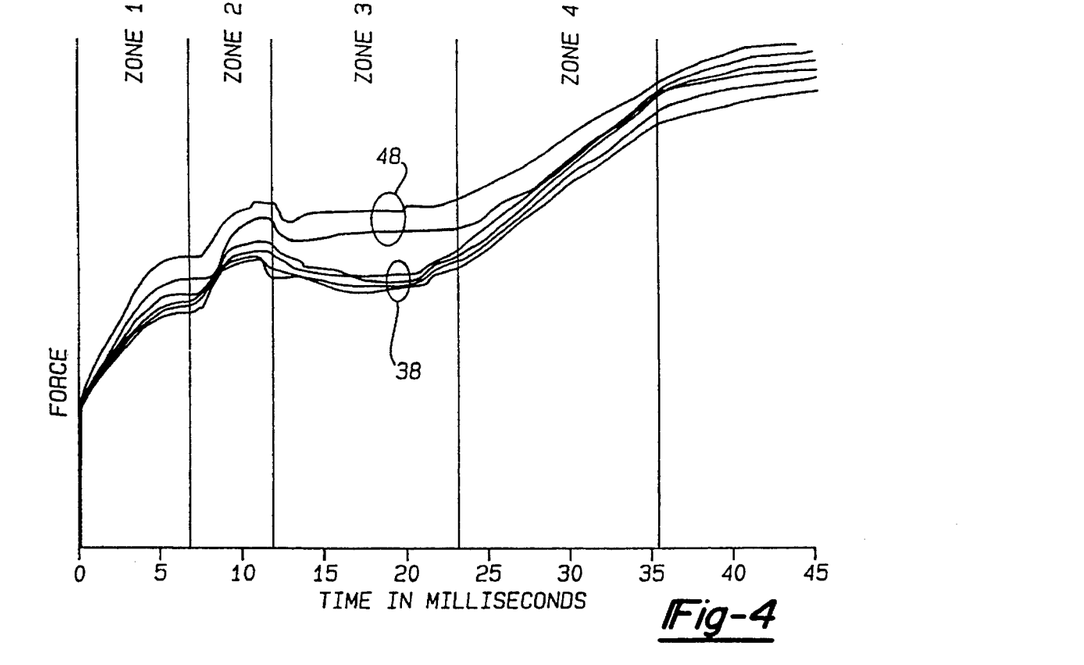
FIG. 4 is a graphical representation of a nominal force signature bounded on its upper side by a misalignment force signature.

Now referring to FIG. 3, once nominal force signature 38 is established, it is easy to determine if a particular installation is satisfactory. For example, if the nominal force signature 38 is compared with two actual force signatures 44 generated using metal which is thicker than that found in the nominal range, an obvious difference in force signatures is apparent. Likewise, when nominal force signature 38 is compared with two actual force signatures 46 generated using thin metal, an easily detectible downward and leftward shift takes place in the force signature. FIG. 4 discloses misalignment signature 48, wherein fastener 20 was deliberately misaligned with die button 26. The difference in signatures 48 and 38 is particularly acute when viewed across zone 3.

In view of the above disclosure, it is understood that a force signature can be generated which is characteristic of the nominal forces present during the installation of a fastener to a panel. It has also been illustrated that certain, undesirable conditions may present themselves and may be detectible by monitoring the actual force signature generated during a given installation and comparing that actual force signature to the nominal signature. If the actual force signature deviates from the nominal force signature beyond predetermined limits, corrective action may be taken. The following portion of this disclosure sets forth a system which monitors the difference between a nominal force signature and an actual force signature and automatically takes corrective action if the actual force signature deviates from the nominal force signature beyond predetermined limits.

Figure 5:
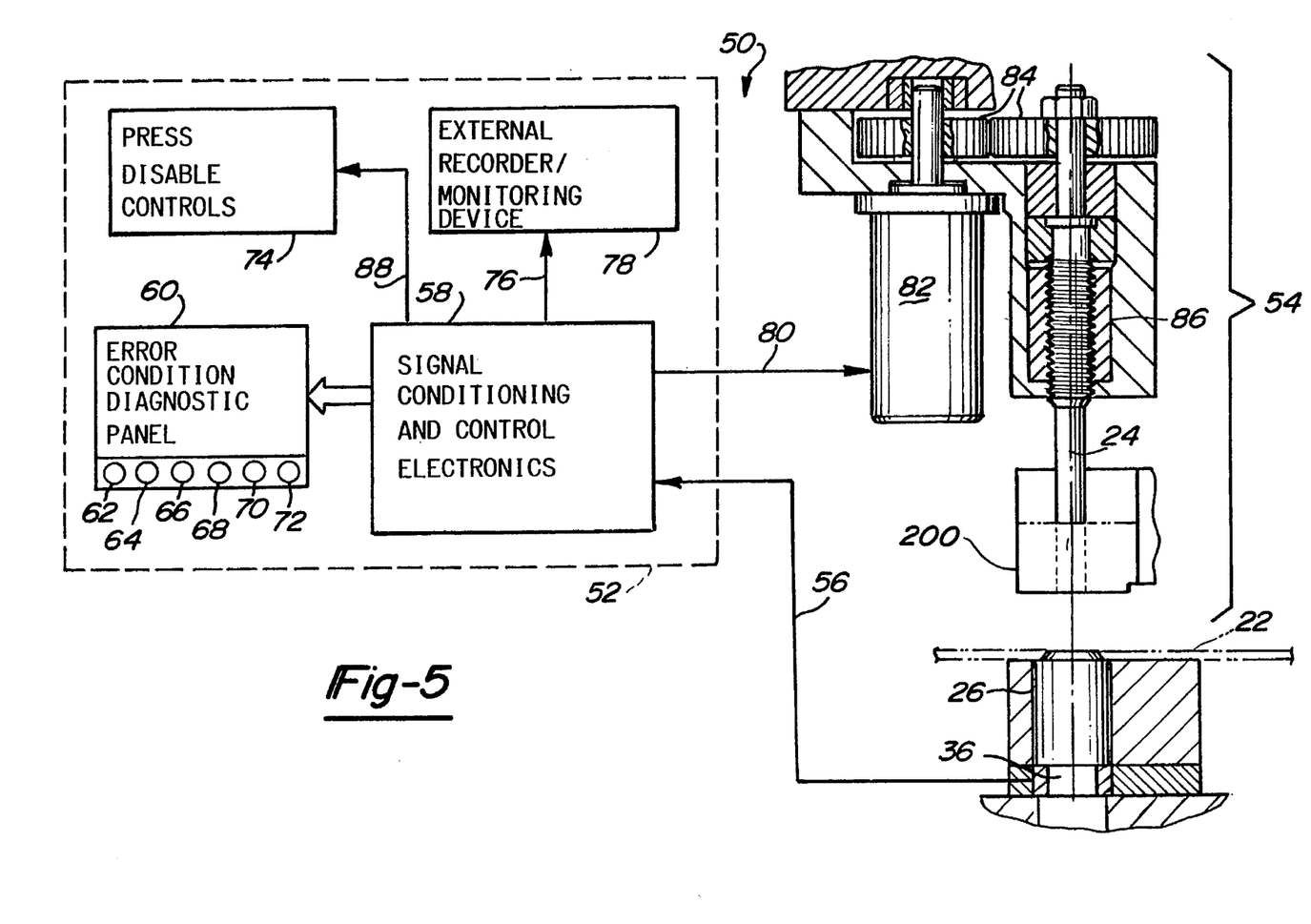
FIG. 5 is a schematic representation of the self-adjusting head of the present invention.

With reference to FIG. 5, self-adjusting head 50 includes electronics portion 52, servo-mechanism 54, and force sensor 36. Force sensor 36 generates an electronic output signal along line 56, representative of the force exerted by plunger 24 during the installation process. Signal conditioning and control electronics 58 is responsible for converting the force signal present on line 56 into a useable format (preferably digital format) and also conducting the comparison between nominal force signature 38 and actual force signatures generated by sensor 36. Control electronics 58 can be programmed to indicate certain error conditions by way of illuminating one or more lights 62–72 on error conditioned diagnostic panel 60. Signal conditioning and control electronics 58 can also be programmed to disable the press 74 upon the occurrence of predetermined error conditions. Signal conditioning and control electronics 58 is also capable of outputting an electronic signal along line 76 so that an external recorder or monitoring device 78 can be used to create a permanent record of a force signature, commonly referred to as the statistical process control data or SPC, for each stroke of the press.

One primary function of signal conditioning and control electronics 58 is to monitor the output of force sensing device 36 and to generate, along line 80 the appropriate correction signal to servo-mechanism 54, or if manual adjustment is used to send the information to an indicator that can indicate the amount of adjustment needed or indicate when enough adjustment has been done to correct the problem.

One such example of this corrective technique will now be explained in conjunction with FIG. 3. Assume that self-adjusting head 50 has been programmed to expect to receive an actual force signal as defined by the bounds of nominal force signature 38 in FIG. 3. Additionally, assume that, in fact, signal conditioning and control electronics 58 receives a force signature falling within the bounds of thin metal signature 46. Signal conditioning and control electronics 58 is programmed to recognize that the signature being received is characteristic of a thin panel condition and take corrective action. A corrective error signal is generated by signal conditioning and control electronics and sent along line 80 to servo-mechanism 54. As illustrated in FIG. 5, adjustable-mechanism 54 is comprised of motor 82, gear drive 84, and lag screw 86. The corrective signal sent along line 80 causes motor 82 to turn in the appropriate direction, thereby causing plunger 24 to extend downwardly by the appropriate magnitude. Thus, by extending plunger 24 downwardly, the thin metal condition is compensated for and once again fasteners 20 can be installed in panel 22 to yield an installation of acceptable integrity. Of course, under some error conditions, the upward or downward adjustment of plunger 24 will not correct the problem at hand. For example, in FIG. 4, signature 48 represents a signature caused by misalignment of die button 26 and fastener 20. No amount of vertical adjustment of plunger 24 will correct for a misaligned condition. Under such a condition, signal conditioning and control electronics 58 would simply generate the appropriate signal to error condition diagnostic panel and along line 88 to initiate the disablement of the press 74.

Figure 6:
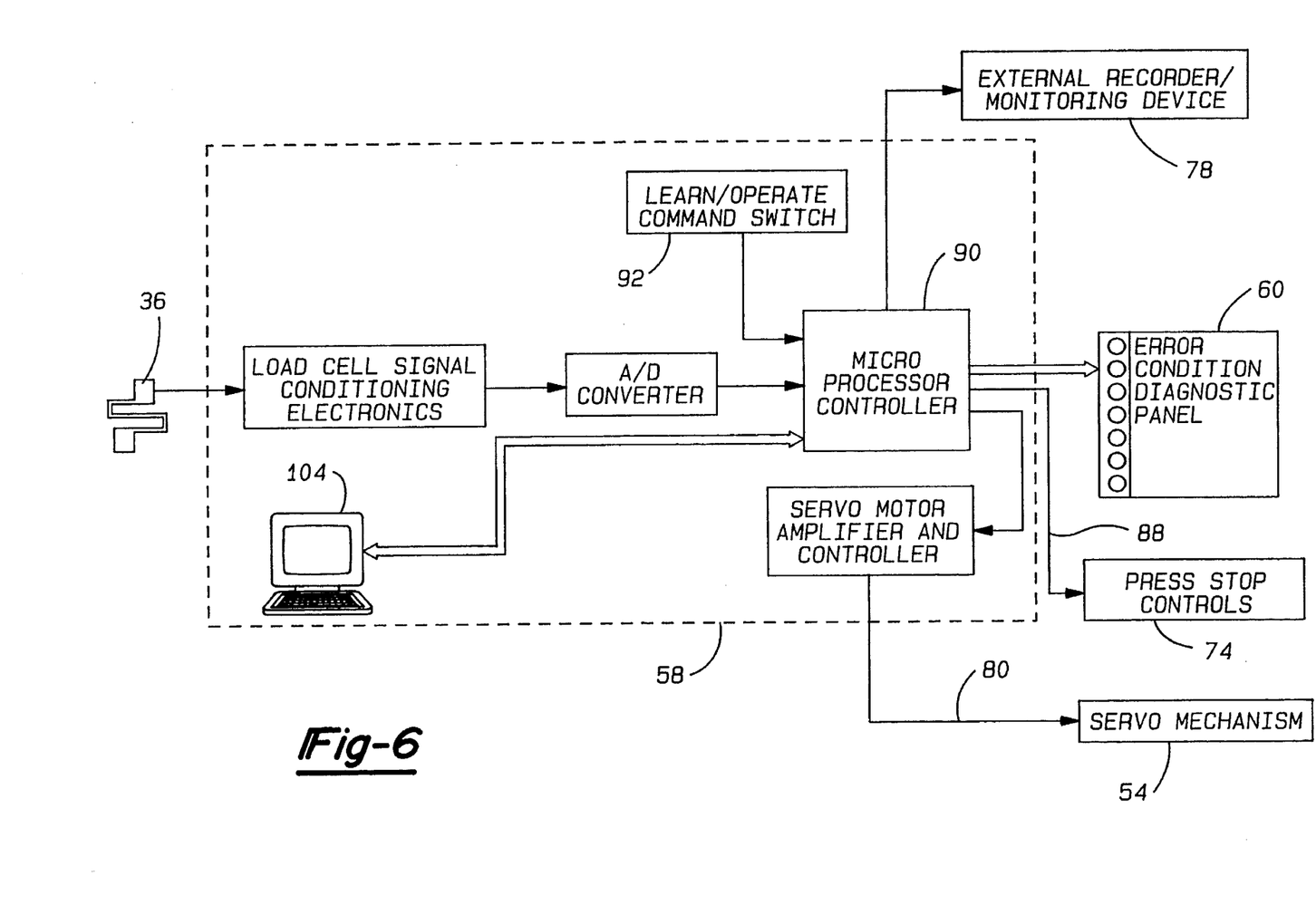
FIG. 6 is a block diagram of the electronic control portion of the self-adjusting head of the present invention.

Now referring to FIG. 6, signal conditioning and control electronics 58 preferably includes microprocessor controller 90. Microprocessor controller 90 is programmed to learn the nominal force signature 38, to monitor the actual force sensed by sensor 36, and to output the appropriate signals to error condition diagnostic panel 60, press disable controls 74 and adjustable-mechanism 54. Signal conditioning and control electronics 58 has two primary modes of operation—learn mode and operate mode. Both modes will now be discussed.

LEARN MODE

Figure 7:
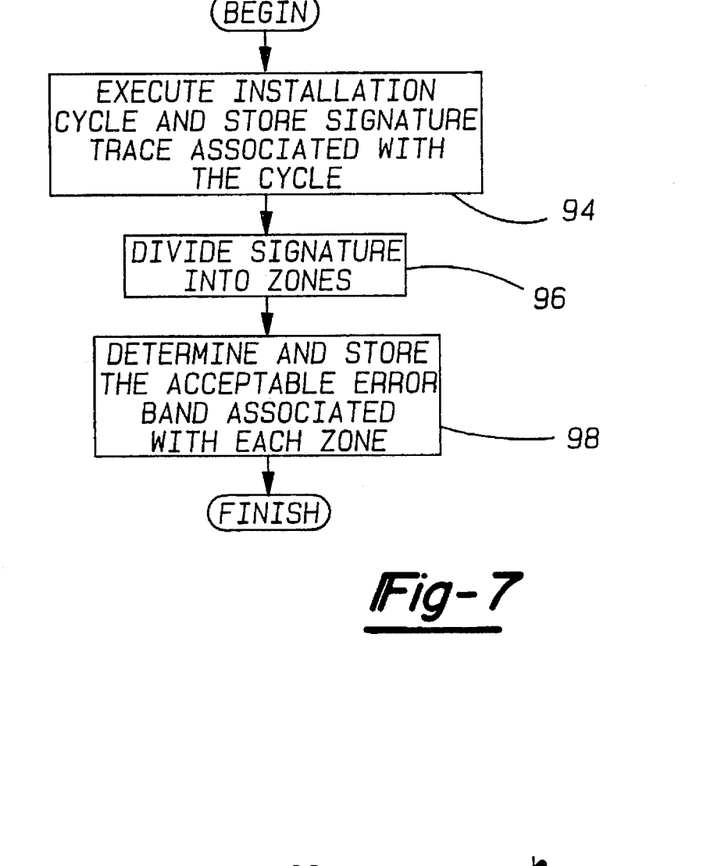
FIG. 7 is a flow chart depicting the learn phase of the present invention.

Now referring to FIGS. 4–8, to initiate the learn mode, the learn/operate command switch 92 is activated by the system operator. This indicates to microprocessor controller 90 that the operator wishes to teach microprocessor controller the nominal force signature 38 for the particular installation process at hand. FIG. 7 sets forth the three primary steps involved in executing the learn mode. First, as a number of fasteners are installed into panels and, for each installation microprocessor controller 90, reads and stores the actual force signature. Microprocessor controller 90 can store this information in graphical format or tabular format. The information is analyzed to determine the envelope of the nominal force signatures. The envelope of nominal force signature curve is exemplified as 38 in FIG. 4. Nominal signature 38 is divided into zones 96 (see FIG. 8) and an acceptable high and low error band 100, 102 is defined and associated with each zone.

The generation of a high/low error band can be either automatically generated by the software, based on past knowledge of the installation process, or may be manually input based on data collected from simulated error conditions. For example, in reference FIG. 3, force signature 46 was generated by placing a fastener into an undersized panel. Likewise, force signature 44 was generated by inserting a fastener into an oversized panel. Thus, knowing the characteristics of the thin and thick metal signatures, error bands can be constructed around nominal signature 38 such that a force value occurring between the error bands indicates an acceptable installation, and a force value occurring outside the error bands indicates an unacceptable fastener installation. It is also apparent that selected zones may be more appropriate for making pass/fail determinations than other zones. For example, in FIG. 3, zone 1, the thick metal signature 44 does not make any substantial separation from nominal signature 38. It is not until zone 2 that a separation occurs. Thus, it appears that zone 1 would not be the preferred zone to make a determination for a thick metal signature. Likewise, misaligned signature 48 achieves its maximum separation from nominal signature 38 in zone 3; thus, zone 3 appears to be the most beneficial zone for determining the occurrence of a misaligned error condition. It is evident from the error conditions illustrated in FIGS. 3 and 4 that the force signature associated with each error condition has its own characteristics. By programming microprocessor controller to monitor key characteristics, not only can microprocessor controller 90 determine when an error condition occurs, but it is also capable of determining what kind of error condition occurred. This information can be displayed to the user via terminal 104 and/or error condition diagnostic panel 60. This type of information is invaluable when diagnosing the cause of improper fastener/panel installations.

OPERATE MODE

Figure 8:
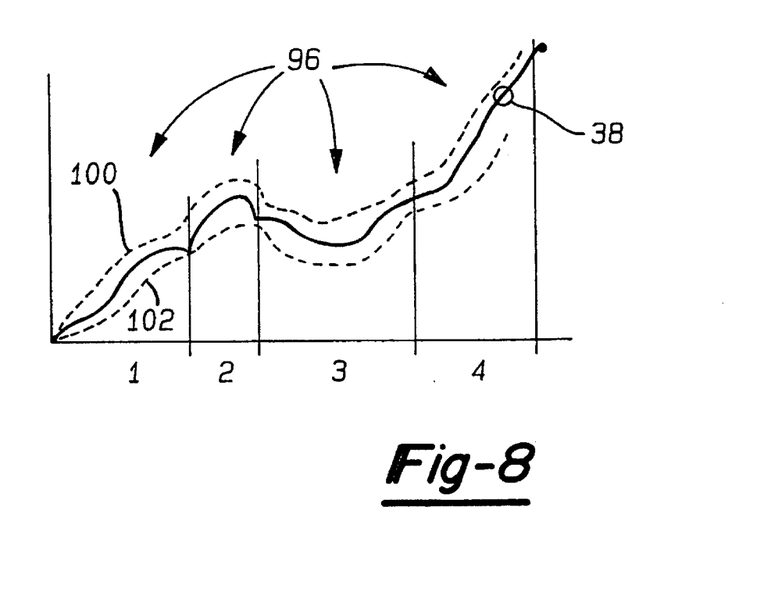
FIG. 8 is a graphical representation of a nominal force signature bounded by high and low error bands.
Figure 9:
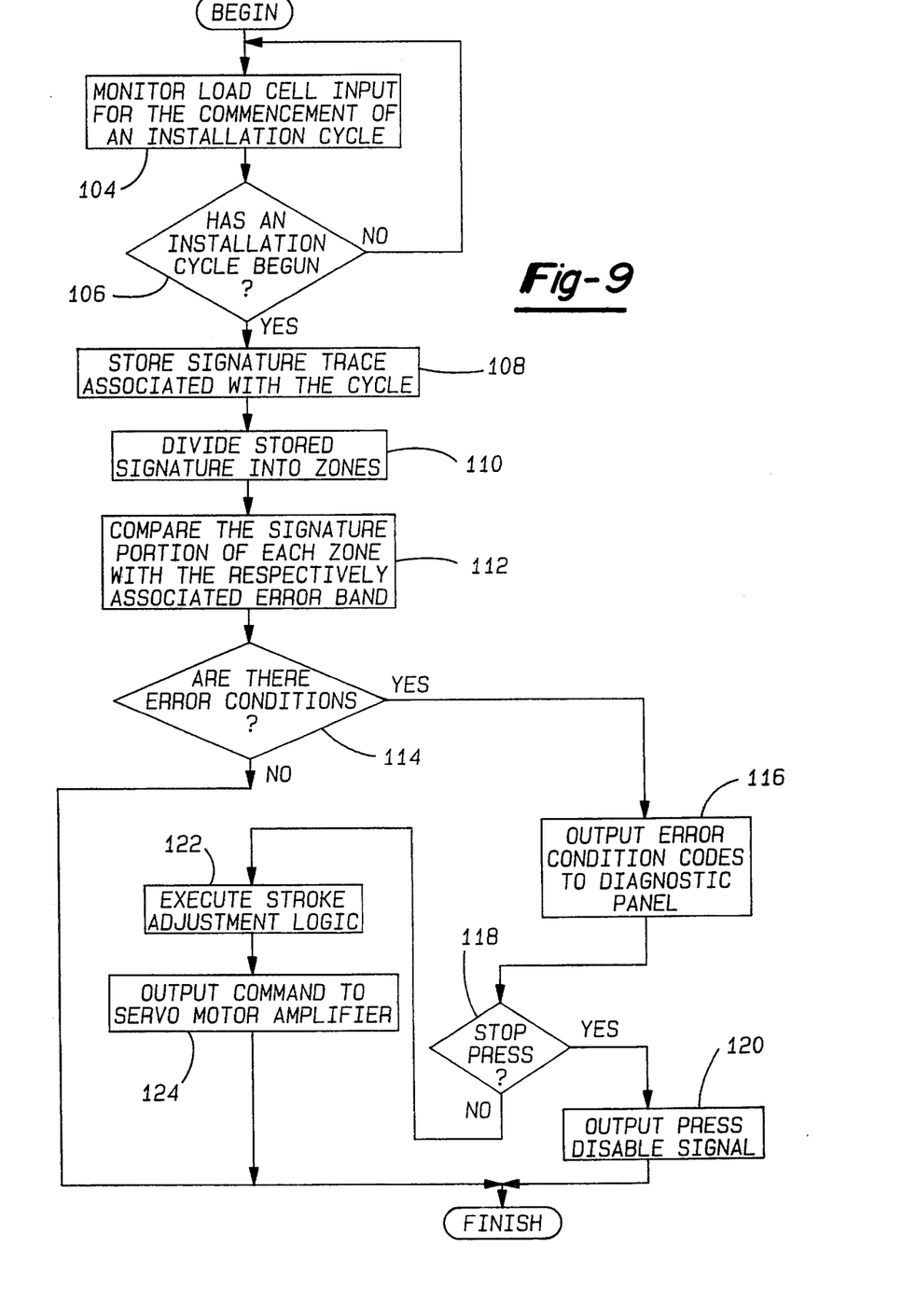
FIG. 9 is a flow chart depicting the learn phase of the present invention.

Now referring to FIGS. 7–9. After the learn mode (see FIG. 7) has been executed and the nominal force signature 38 is generated (along with the error band associated with each zone), self-adjusting head 50 is ready for operation. Thus, microprocessor controller 90 holds in a wait loop 104, 106 waiting for the first fastener to be installed. Upon the commencement of an installation cycle 106, microprocessor controller 90 collects and stores the force signature associated with the actual installation cycle 108. The stored signature is divided into zones which correlate in time with zones 96 defined during the learn mode. Preferably, these zones are defined as fixed time segments within one installation cycle. An installation cycle is defined as that time commencing with plunger 24 contacting fastener 20 and ending at such time as plunger 24 no longer contacts fastener 20. Next, the actual load signature associated with each zone is compared to the error band associated with that zone to determine whether it falls within the error band or outside of the error band. If the signature falls within the error band 114, there are no error conditions present, and controller 90 returns to the wait state 104, 106. If there are error conditions present, the particular error condition is diagnosed 116 (e.g., thick panel, thin panel, misalignment, etc.) and the appropriate error condition code or codes are transferred to error condition diagnostic panel 60 and/or terminal 104. Based on the type of error condition presented, a determination is then made whether or not to disable the press 118. If it is the type of error condition (e.g., misalignment condition) that calls for press disablement, the appropriate signal is sent from microprocessor controller 90 over line 88 to press disable control 74, wherein the press is disabled 120. If the existing error condition is one in which the press does not need to be disabled, microprocessor controller 90 executes the stroke adjustment logic 122 and outputs the appropriate command 124 to servo-motor amplifier.

In a prototype of the present invention, it was found that zones 1 and 2 were useful for detecting error conditions which could not be corrected by adjusting plunger 24. Thus, zones 1 and 2 were primarily used to test for conditions which would justify shutting down the press. Zones 3 and 4 were most useful in detecting conditions which could be rectified by adjusting plunger 24. Preferably, the installation signature is divided into four zones wherein:

1. Zone 1 is used for monitoring panel presence; if the panel is missing the press shuts down.
2. Zone 2 is used for monitoring piercing load; if the die is defective or materials is too hard, too soft, etc., the press shuts down.
3. Zone 3 is used for monitoring the forming of metal into nut; if an error condition exists, the plunger is adjusted up or down according to the error control strategy.
4. Zone 4 monitors setting load; if an error condition exists, the plunger is adjusted up or down according to the error control strategy.

Although many schemes can be employed in stroke adjustment logic 122, the simplest scheme is to compute the difference between the average nominal force signature for a given zone and the average actual force signature for a given zone. This difference could then be multiplied by a gain factor and the result of the multiplication could then be added to an offset factor figure. This type of error correction scheme is known as "proportional control" and is well known to those skilled in the art. The value of the gain figure and the offset figure could be empirically determined by measuring the actual amount of plunger 24 travel that must be effectuated to correct for an error condition of a given magnitude. Of course, other, more sophisticated control schemes may be used involving integral and derivative terms, etc. Such sophisticated control schemes are well known to those skilled in the art of adjustable-motor controls.

The following error conditions are detectible using the self-adjusting head of the present invention:

A. Metal thickness tolerance drift.

B. Broken die button.

C. Misalignment between the fastener and the die button.

D. Improper die button.

E. Improper material hardness.

F. Missing nut and/or panel.

G. Excessive tool wear.

H. Drift in press adjustment or setting.

I. Improper or malformed nut or fastener.

ALTERNATIVE EMBODIMENTS OF SERVO-MECHANISM

As more fully described above, a first embodiment of adjustable-mechanism 54 is disclosed in FIG. 5 and includes adjustable motor 82, gear drive 84, and screw thread 86.

Figure 10:
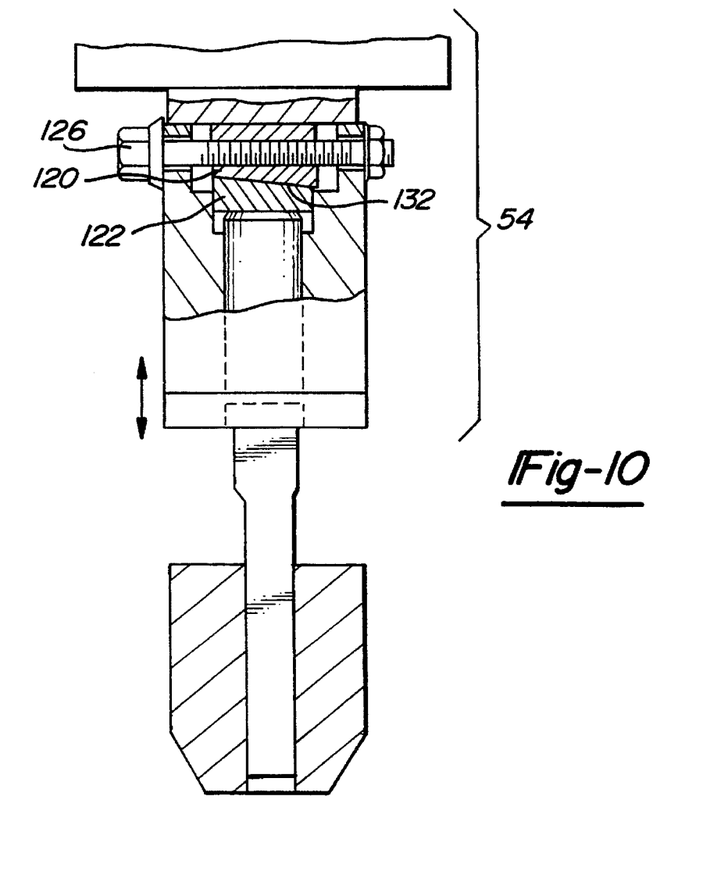
FIG. 10 is a second embodiment of the servo-mechanism of the present invention.
Figures 14, 15:
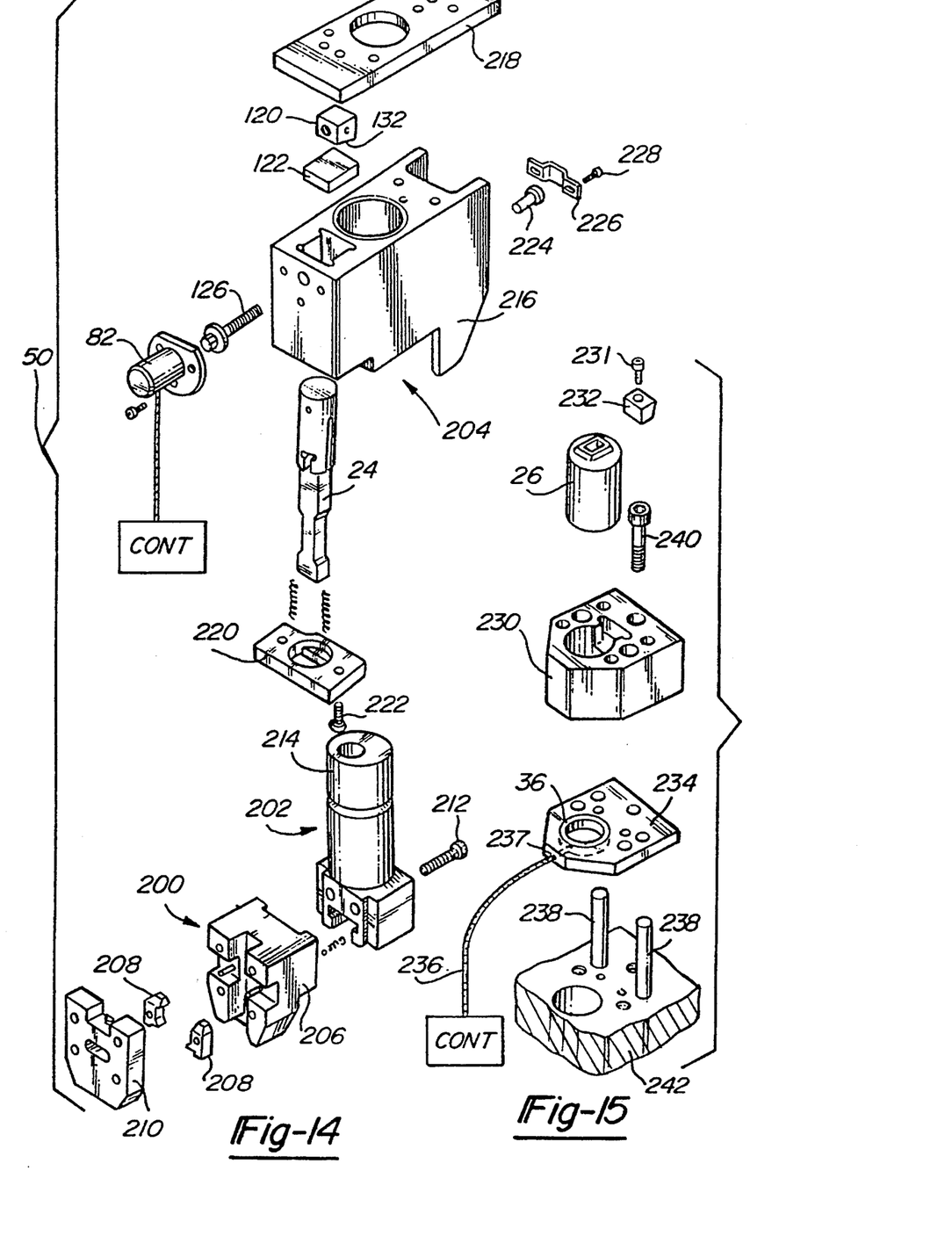
FIGS. 14 and 15 are exploded prospective views of the installation head of the present invention showing the head and die button.

With reference to FIGS. 10, 14, and 15, the preferred embodiment of an adjustable-mechanism 54 is illustrated. Mechanism 54 includes a first wedge 120, which engages a second wedge 122. The first wedge 120 is attached to a screw thread 126, which is, in turn, coupled to motor 82 (see FIG. 14). As motor 82 receives an error correction signal along line 80, motor 82 rotates its output shaft thereby causing screw 126 to rotate. Rotation of screw 126 causes wedge 120 to move laterally. Because surface 132 is inclined with respect to the centerline of wedge 120, the lateral movement 128 of wedge 120 causes vertical movement of plunger 24. Thus, the preferred embodiment of adjustable-mechanism 54 is effective for providing vertical movement of plunger 24.

Continuing with FIGS. 14 and 15, an exploded perspective view of the adjustable head 50, die button 26, and the load sensing device 36 will be described. The adjusting head 50 includes a nose sub-assembly 200, a shank sub-assembly 202, and a base sub-assembly 204. The nose sub-assembly 200 includes a nose body 206, nut holder fingers 208, and a nose plate 210. Nut holder fingers 208 are pivotally mounted within nose body 206 to receive and hold a nut to be installed.

The shank sub-assembly 202 includes a punch housing nose shank 214. Nose shank 214 is attached to nose sub-assembly 200 by screws 212 (only one screw is shown).

The base sub-assembly 204 includes a punch support base 216, a back-up plate 218, and a nut plunger 24. Back-up plate 218 is bolted to base 216. Screws 222 attach plate 220 to base 216. A punch housing shank stop pin 224 is mounted in the rear of the punch support base 216. Pin 224 is retained by a plate 226 and screws 228. Only one is illustrated.

In operation, the base sub-assembly 204 is mounted to one of the platens of the press. As the press closes, the nut plunger 24 pierces a nut through a panel positioned on the die button 26. The nose shank 214 reciprocates within base 216 as the press opens and closes. This reciprocation forces the nut plunger 24 into the nose body 206, and against a nut to pierce the nut through the panel. The movement of shank 214 relative to base 216 is adapted to control a mechanical Reel-Feed assembly, not illustrated. (Reel-Feed is a registered trademark of Multifastener Corporation.)

Figure 11A:
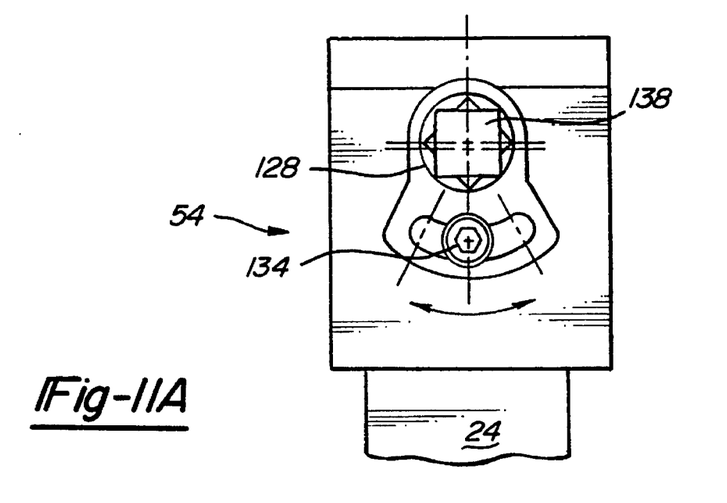
FIG. 11A is a side view of a third embodiment of the servo-mechanism of the present invention.
Figures 11B, 11C, 12, 13:
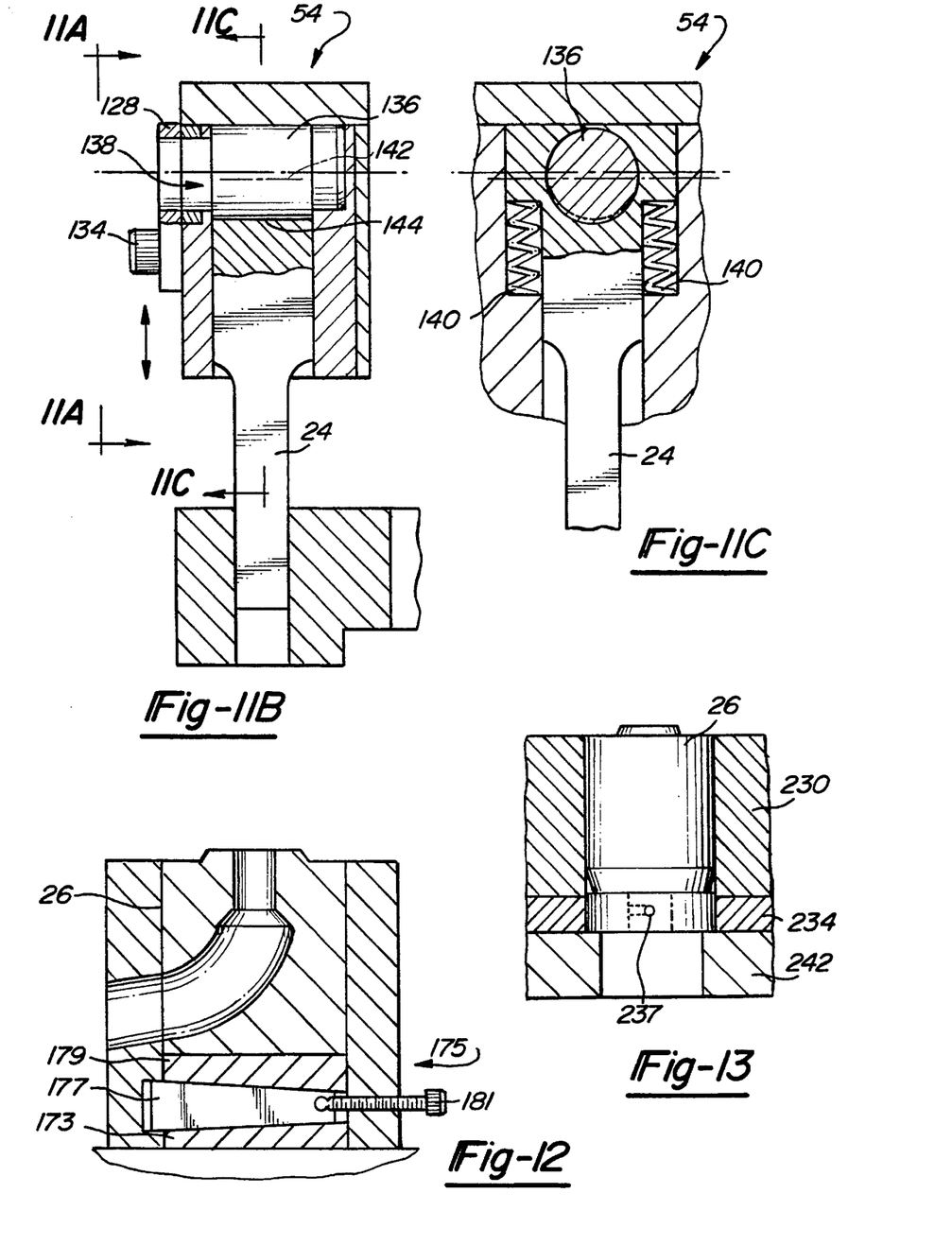
FIG. 11B is a partially cut-away view of the third embodiment of the servo-mechanism of the present invention.
FIG. 11C is a cut-away view taken along line 11C of FIG. 11B.
FIG. 12 is an embodiment illustrating an adjustable die button.
FIG. 13 is a cut-away view of the die button and load sensing device of the present invention.

Referring to FIGS. 13 and 15, the die button 26 and load sensing device 36 will be described further. The die button 26 is mounted within retainer 230. A retention key 232 and screw 231 retain die button 26 in retainer 230. Mounted below die button 26 is a load sensing device 36. In the preferred embodiment, load sensing device 36 is mounted within a back-up plate 234. In this embodiment, the sensing device 36 is pressed into an opening in back-up plate 234. It should be appreciated that the sensing device 36 could be molded directly into plate 234 or mounted in various other ways, of knowledge to those of ordinary skill in the art. An electrical lead 236 is received within an opening 237 in plate 234 to the electronics portion 52. Guide pins 238 and screws 240 are used to mount the retainer 230 to a platen 242. In the preferred embodiment, plate 234 is mounted to retainer 230 by, for example, screws.

FIGS. 11A–11C disclose a further embodiment of adjustable-mechanism 54. This embodiment employs an eccentric cam 136, having head 138, which is rotatable by way of a hand tool. In the disclosed embodiment, the cam head 138 is intended to be manually adjusted. Once adjusted, a locking tab 128 can be locked by tightening bolt 134. Plunger 24 is biased against eccentric cam 136 by way of bias springs 140. When cam head 138 is rotated, eccentric cam 136 rotates about axis 142. Because outside surface 144 of eccentric 136 is not concentric with axis 142, outside surface 144 causes plunger 24 to move laterally 134. This lateral movement is effective for adjusting the plunger as has already been discussed.

With reference to FIG. 12, a still further embodiment of the present invention is illustrated. In this embodiment, the adjusting device 175 is positioned under the die button 26. The adjusting device 175 includes a wedge 177 sandwiched between wedge 179 and a plate 173, which is illustrated as a second wedge. It should be understood that plate 173 could be a flat plate, if desired. A screw thread 181 is attached to wedge 177. rotation of screw thread 181 causes wedges 179 to move die button 26 longitudinally. As should be appreciated, the screw thread 181 can be turned manually or by a screw-motor. In this way, die button 26 can be adjusted to compensate for variations in material thickness.

The foregoing detailed description shows that the various embodiments of the present invention are well suited to fulfill the objects of the invention. It is recognized that those skilled in the art may make various modifications or additions to the preferred embodiments chosen here to illustrate the present invention without departing form the spirit of the present invention. For example, although sensing device 36 is shown residing below die button 26, it may operate satisfactorily above plunger 24. Accordingly, it is to be understood that the subject matter sought to be effective protection hereby should be deemed to extend to the subject matter defined in the appended claims, including all fair equivalents thereof.

What is claimed is:

1. A method for installing a fastener into a panel, said method comprising the steps of:
   (a) providing an adjustable installation apparatus between the platens of a press;
   (b) positioning a panel and a fastener between the platens of the press adjacent the installation apparatus;
   (c) closing said platens to a predetermined shut height, said shut height being the distance between the platen faces when one of said platens is at the bottom of its stroke;
   (d) monitoring the load exerted by said fastener installation apparatus upon said fastener during step (c);
   (e) comparing said monitored load to a predetermined load, said predetermined load being the proper load for properly installing said fastener in said panel;
   (f) indicating the result of step (e) and if said result is within a first range, adjusting the relative position between the adjustable installation apparatus and the work piece, and if said result is within a second range, disabling the press.

2. The method of claim 1, wherein the monitoring of step (d) further includes the sub-steps of:
   (i) collecting, as a function of time, an electronic signal representative of monitored load and converting said signal into a series of load values and storing said load values as a function of time;
   (ii) dividing the stored values of sub-step (i) into predetermined zones.

3. The method of claim 2, wherein the comparing of step (e) includes the sub-steps of:
   (iii) determining a plurality of nominal load values as a function of time;
   (iv) dividing the plurality of nominal load values into zones, corresponding to said zones of sub-step (ii);
   (v) selecting at least one value from one of said zones from sub-step (ii) and comparing it to at least one of said nominal values in its corresponding zone from sub-step (iv).

\* \* \* \* \*